(12) United States Patent
Chang

(10) Patent No.: US 11,031,808 B2
(45) Date of Patent: Jun. 8, 2021

(54) POWER SUPPLY SYSTEM

(71) Applicant: DELTA ELECTRONICS, INC., Taoyuan (TW)

(72) Inventor: Shih-Chieh Chang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 97 days.

(21) Appl. No.: 16/503,965

(22) Filed: Jul. 5, 2019

(65) Prior Publication Data
US 2020/0220379 A1    Jul. 9, 2020

(30) Foreign Application Priority Data
Jan. 3, 2019 (CN) .......................... 201910003836.X (51) Int. Cl.
| H02J 9/06 | (2006.01) |
| H02J 3/32 | (2006.01) |
| H02J 4/00 | (2006.01) |
| H02J 1/14 | (2006.01) |

(52) U.S. Cl.
CPC .............. *H02J 9/062* (2013.01); *H02J 1/14* (2013.01); *H02J 3/32* (2013.01); *H02J 4/00* (2013.01)

(58) Field of Classification Search
CPC ...... H02J 9/062; H02J 1/14; H02J 3/32; H02J 4/00
USPC ........................................ 307/44, 64, 65, 82
See application file for complete search history.

(56) References Cited

U.S. PATENT DOCUMENTS

| 6,278,200 | B1* | 8/2001 | Daniel | H02J 3/0073 |
| | | | | 307/31 |
| 8,193,662 | B1* | 6/2012 | Carlson | G06F 1/30 |
| | | | | 307/66 |
| 2016/0342182 | A1* | 11/2016 | Deboy | H02M 3/33507 |
| 2020/0153255 | A1* | 5/2020 | Inoue | H02J 7/0048 |

FOREIGN PATENT DOCUMENTS

| TW | 201225473 A | 6/2012 |
| TW | 201249062 A | 12/2012 |
| TW | I-633743 B | 8/2018 |

OTHER PUBLICATIONS

Office Action dated Jul. 17, 2019 in TW Application No. 108100168 (10 pages).

* cited by examiner

*Primary Examiner* — Michael R. Fin
(74) *Attorney, Agent, or Firm* — Muncy, Geissler, Olds & Lowe, P.C.

(57) ABSTRACT

A power supply system is connected to a load, and the power supply system includes a power supply apparatus and a backup apparatus. When an input power is normal, the power supply apparatus converts the input power into a first output power, provides the first output power to the power bus, and selectively provides the first output power to charge the backup apparatus, in which the first output power has a first rated upper-limit value. When the input power is normal and a required power of the load is greater than the first rated upper-limit value, the backup apparatus provides a second output power to the power bus so that the sum of the first output power and the second output power meets the required power of the load.

11 Claims, 4 Drawing Sheets

POWER SUPPLY SYSTEM

BACKGROUND

Technical Field

The present disclosure relates to a power supply system, and more particularly to a power supply system having a passive hybrid power supply and a storage apparatus.

Description of Related Art

The statements in this section merely provide background information related to the present disclosure and do not necessarily constitute prior art.

At present, large-scale or mega-scale data centers are facing with and trying to solve problems of high costs, low flexibility, low scalability, low efficiency, low usage rate, high idle rate, and inconvenient management. In order to avoid serious commercial and data losses due to increased demands of the large-scale data centers and instantaneously increased time clock of center processing units, a stable uninterruptible power system which can provide instantaneous power is necessary.

When an AC or DC power is normal (e.g., output of mains supply is stable), a power supply provides a stable power to a load (e.g., a data center). On the contrary, the AC or DC power is abnormal (e.g., the interruption of mains supply), an additional energy-storing apparatus is needed to provide the required power of the load. Being different from an emergency generator or an emergency electrical system (e.g., a flywheel, a fuel cell, or a generator), the uninterruptible power system supplies power to the load by the power supply if the AC or DC power is normal, and alternatively the energy-storing apparatus of the uninterruptible power system provides the instantaneous power to the load if the AC or DC power is abnormal. Therefore, the uninterruptible power system is commonly used for supplying the data centers, computers, or telecommunications devices to avoid serious commercial and data losses if unexpected power interruption occurs.

Since the maximum output power of the power supply and the backup apparatus of the conventional uninterruptible power system has been limited, the power supply would be overloaded to shut down once the required instantaneous power of the load exceeds the required general power thereof. Further, the backup apparatus starts to supply the overloaded current to the load, thereby reducing a lifespan of the backup apparatus. In addition, since the backup apparatus usually has no converter for a current-sharing design, the imbalance and aging of the backup apparatus would be accelerated. In order to solve the problem of insufficient instantaneous power, the additional output power of the power supply and/or the increased number of the backup apparatus is required, thereby increasing the costs of the conventional uninterruptible power system.

SUMMARY

The present disclosure provides a power supply system, and the power supply system includes a power supply apparatus and a backup apparatus. The power supply apparatus receives an input power to supply power to a load through a power bus. The backup apparatus is coupled to the power bus. When the input power is normal, the power supply apparatus converts the input power into a first output power, provides the first output power to the power bus, and selectively provides the first output power to charge the backup apparatus. The first output power has a first rated upper-limit value. When the input power is normal and a required power of the power bus is greater than the first rated upper-limit value, the backup apparatus provides a second output power to the power bus so that the sum of the first output power and the second output power meets the required power of the power bus.

The present disclosure provides another power supply system, and the power supply system includes a power supply apparatus, a backup apparatus, and a storage apparatus. The power supply apparatus receives an input power to supply power to a load through a power bus. The backup apparatus is coupled to the power bus. The storage apparatus is coupled to the power bus. When the input power is normal, the power supply apparatus converts the input power into a first output power, provides the first output power to the power bus, and selectively provides the first output power to charge the backup apparatus and the storage apparatus. The first output power has a first rated upper-limit value. When the input power is normal and a required power of the power bus is greater than the first rated upper-limit value, the storage apparatus provides a third output power to the power bus so that the sum of the first output power and the third output power meets the required power of the power bus. When the input power is abnormal, the power supply apparatus stops operating, and the backup apparatus provides a first backup power to supply the load through the power bus. The first backup power has a second rated upper-limit value.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWING

The present disclosure can be more fully understood by reading the following detailed description of the embodiment, with reference made to the accompanying drawings as follows.

DETAILED DESCRIPTION

Reference will now be made to the drawing figures to describe the present disclosure in detail. It will be understood that the drawing figures and exemplified embodiments of present disclosure are not limited to the details thereof.

Figure 1:
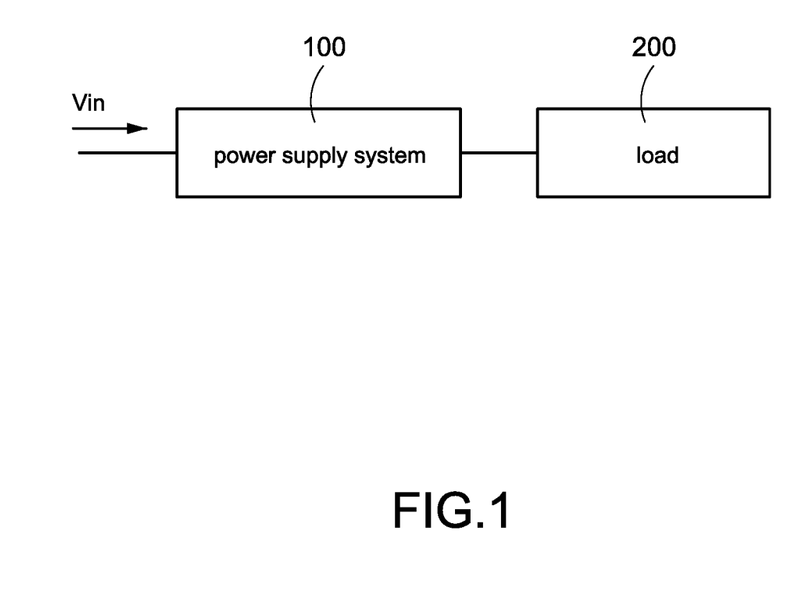
FIG. 1 is a schematic block diagram of a power supply system according to the present disclosure.

Please refer to FIG. 1, which shows a schematic block diagram of a power supply system according to the present disclosure. The power supply system 100 is coupled to a load 200, and provides a stable power to the load 200. When an input power Vin is available, i.e., the input power Vin is normal or stable, the power supply system 100 converts the input power Vin into the required power of the load 200. If the input power Vin is abnormal, such as a power failure or a power unavailability, the power supply system 100 provides the stored internal power to the load 200 to avoid the unpredictable power interruption in the load 200. In one embodiment, the input power Vin may be, for example but not limited to, generated from one of solar panels, fuel cells, flywheels, generators, and renewable energies, or a combination of more than two of them. The input power Vin can be replaced by other powers, such as but not limited to a mains supply. In addition, in one embodiment, the load 200 may be a key apparatus, such as but not limited to a central server, an exchanger, a super computer, or a precision manufacturing device. In other words, the load 200 defined in the present disclosure is that a load needs to be uninterruptedly supplied if the input power Vin is instantaneously abnormal.

Figure 2A:
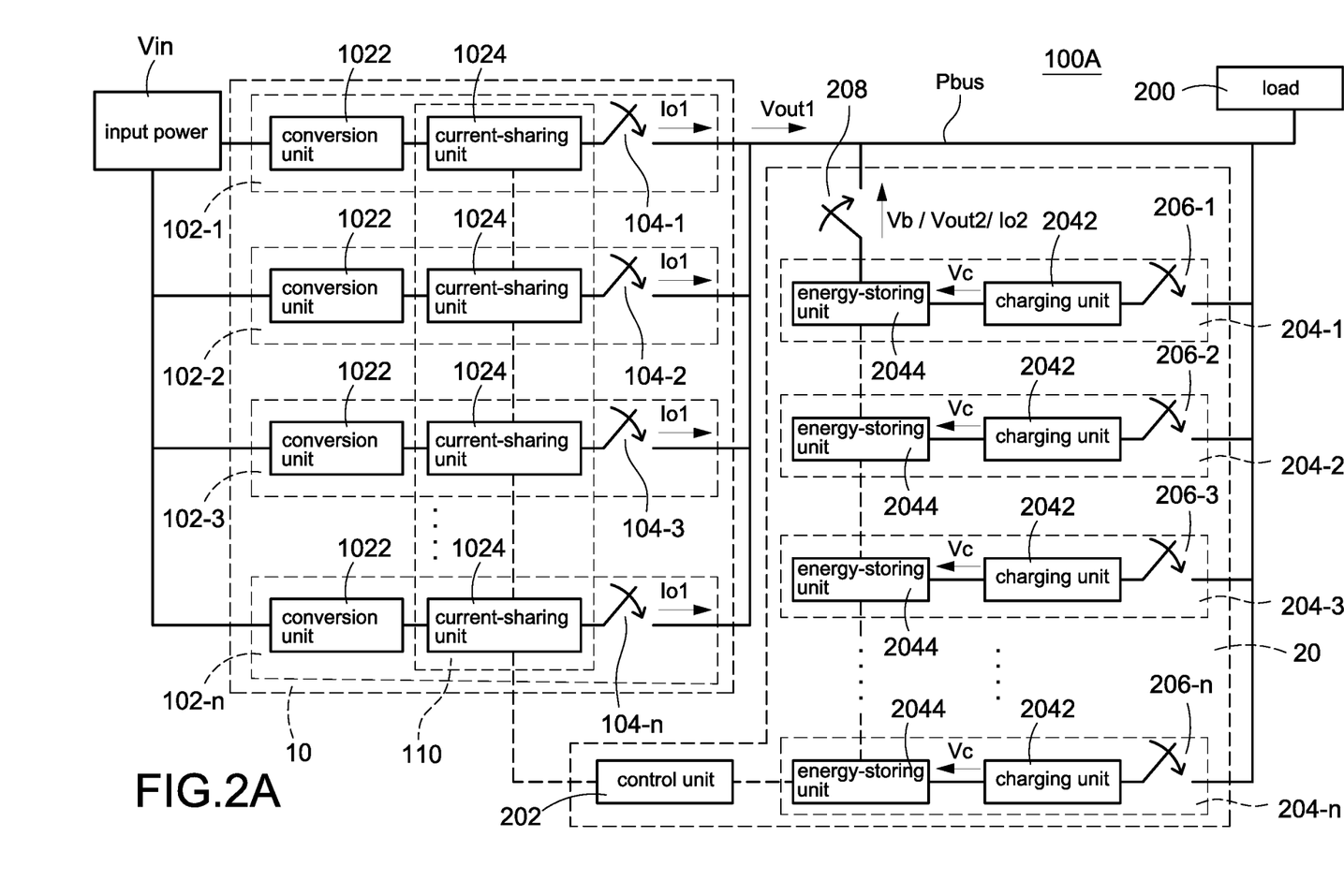
FIG. 2A is a schematic block diagram of the power supply system according to a first embodiment of the present disclosure.

Please refer to FIG. 2A, and also refer to FIG. 1. A power supply system 100A includes a power supply apparatus 10 and a backup apparatus 20. The power supply apparatus 10 receives the input power Vin and supplies power to the load 200 through a power bus Pbus. The backup apparatus 20 is coupled to the power supply apparatus 10 and the load 200 through the power bus Pbus. Therefore, when the input power Vin is normal, the additional power can be provided to supply the load 200; when the input power Vin is abnormal, the stored internal power can be provided to supply the load 200.

More specifically, when the input power Vin is normal, for example a utility electrical grid provides a stable power, the power supply apparatus 10 converts the input power Vin into a first output power Vout1, and the first output power Vout1 is provided to the load 200 through the power bus Pbus. In one embodiment, the first output power Vout1 has a first rated upper-limit value. In other words, under the absence of the backup apparatus 20, when the required power of the load 200 is greater than the first rated upper-limit value, the power supply apparatus 10 may be in abnormality or failure resulted from an overload thereof. In addition, when the power stored in the backup apparatus 20 is insufficient, the power supply apparatus 10 simultaneously provides the first output power Vout1 to charge the backup apparatus 20 through the power bus Pbus until the backup apparatus 20 is fully charged.

When the input power Vin is abnormal, such as power failure, voltage drop, inrush current, continuous undervoltage/overvoltage, or line noise of the mains supply, the power supply apparatus 10 stops operating and the backup apparatus 20 is replaced to provide a backup power Vb to the power bus Pbus and therefore to supply the required power of the load 200. Similarly, the backup power Vb has a second rated upper-limit value, and the second rated upper-limit value may be equal to or different from the first rated upper-limit value in accordance with actual applications.

When the input power Vin is normal and the required power of the load 200 is greater than the first rated upper-limit value of the first output power Vout1, the backup apparatus 20 provides a second output power Vout2 to the power bus Pbus so that the sum of the first output power Vout1 and the second output power Vout2 meets the required power of the load 200. Specifically, the second output power Vout2 that can be provided from the backup apparatus 20 is equal to subtracting the first rated upper-limit value of the first output power Vout1 from the required power of the load 200. In other words, the required instantaneous power of the load 200 is additionally supplied by the backup apparatus 20. However, the second output power Vout2 provided from the backup apparatus 20 cannot exceed the second rated upper-limit value.

Furthermore, when the required power of the load 200 is less than the first rated upper-limit value of the first output power Vout1, the first output power Vout1 provided from the power supply apparatus 10 can meet the required power of the load 200. On this condition, no additional second output power Vout2 would be provided from the backup apparatus 20. If the required instantaneous power of the load 200 is larger than the first rated upper-limit value, the backup apparatus 20 can immediately provide the additional power to avoid the power supply apparatus 10 being in abnormality or failure resulted from the overload thereof so that the sum of the first output power Vout1 and the second output power Vout2 can meet the required power of the load 200. Accordingly, the power supply system 100A having the hybrid power supply apparatus 10 and backup apparatus 20 complementarily provides the required power of the load 200 so that different powers including the first output power Vout1, the second output power Vout2, and the backup power Vb flexibly supply power.

Please refer to FIG. 2A again, and also refer to FIG. 1. The power supply apparatus 10 includes at least one conversion module 102-1~102-n. If the number of the at least one conversion module 102-1~102-n is plural, the conversion modules 102-1~102-n are operated in parallel. Each conversion module 102-1~102-n includes a conversion unit 1022 and a current-sharing unit 1024. The conversion unit 1022 is coupled to the input power Vin and converts the input power Vin into the first output power Vout1. The current-sharing unit 1024 is coupled to the conversion unit 1022 and the power bus Pbus. If the number of the at least one conversion module 102-1~102-n is plural, the current-sharing units 1024 of the conversion modules 102-1~102-n form a current-sharing loop 110 so that each output current Io1 outputted from each conversion module 102-1~102-n can be equally shared by the corresponding current-sharing unit 1024.

The backup apparatus 20 includes a control unit 202 and at least one backup module 204-1~204-n. If the number of the at least one backup module 204-1~204-n is plural, the backup modules 204-1~204-n are operated in parallel to for simultaneously receiving the first output power Vout1. Each backup module 204-1~204-n includes a charging unit 2042 and an energy-storing unit 2044. The charging unit 2042 is coupled to the power bus Pbus and converts the first output power Vout1 into a charging power Vc. The energy-storing unit 2044 is coupled to the charging unit 2042 and the power bus Pbus and stores the charging power Vc. If the number of the at least one backup module 204-1~204-n is plural, each energy-storing unit 2044 is coupled in parallel to the power bus Pbus for providing the backup power Vb or the second output power Vout2.

In one embodiment, the energy-storing unit 2044 may be formed by a multiple in-series and/or in-parallel circuit structure, for example but not limited to that each energy-storing unit 2044 is formed by a matrix circuit structure. In another embodiment, the control unit 202 may be coupled to one or more than one energy-storing unit 2044, or one or more than one energy-storing unit 2044, and the power bus Pbus may be coupled to one or more than one energy-storing unit 2044. In another embodiment, each backup module 204-1~204-n includes one control unit 202, and one of the control units 202 of the backup modules 204-1~204-n is used to control the output of the backup apparatus 20.

More specifically, when the input power Vin is normal and the power stored in the energy-storing unit 2044 is not full yet, the charging unit 2042 converts the first output power Vout1 provided from the power supply apparatus 10 into the charging power Vc and stores the charging power Vc in the energy-storing unit 2044. When the input power Vin is abnormal, the energy-storing unit 2044 provides the backup power Vb to the power bus Pbus so that the power supply system 100A can still provide the required power for the load 200 to stably operate.

When the input power Vin is normal and the required power of the load 200 is greater than the first rated upper-limit value of the first output power Vout1, the energy-storing unit 2044 provides the second output power Vout2 to the power bus Pbus as well as the power supply apparatus 10 provides the first output power Vout1. On this condition, the first output power Vout1 and the second output power Vout2 are jointly supplied to the load 200 in the power supply system 100A so as to meet the required power of the load 200. In one embodiment, the conversion unit 1022 may be, for example but not limited to, an AC-to-DC conversion unit, a DC-to-DC conversion unit, or an AC/DC-to-DC conversion unit. In addition, the conversion unit 1022 may be a conversion unit that is capable of converting to output an AC power.

The control unit 202 is coupled to the energy-storing unit 2044 and further incorporated with the current-sharing loop 110. The control unit 202 controls whether the energy-storing unit 2044 provides the second output power Vout2 to the power bus Pbus according to the required power of the load 200. When the input power Vin is normal and the required power of the load 200 is greater than the first rated upper-limit value of the first output power Vout1, the control unit 202 realizes the required power of the load 200 through an internal communication and controls the energy-storing unit 2044 to provide the second output power Vout2 to the power bus Pbus.

Specifically, in one embodiment, when the control unit 202 realizes that the required instantaneous power of the load 200, an internal current-sharing circuit (not shown) of the control unit 202 is incorporated with the current-sharing loop 110 so that each output current Io1 outputted from each current-sharing unit 1024 and the output current Io2 outputted from the energy-storing unit 2044 are equally shared by the current-sharing units 1024 and the control unit 202. That is, the sum of output currents Io1 and the output current Io2 are equally shared by the current-sharing units 1024 and the control unit 202 so that each output current Io1 outputted from each current-sharing unit 1024 is equal to the output current Io2 outputted from the energy-storing unit 2044. Therefore, the current-sharing units 1024 and the energy-storing unit 2044 controlled by the control unit 202 can jointly equally share the output current drawn by the load 200. In another embodiment, the control unit 202 can adjust the current value of the output current Io2 according to the load 200, that is, the current value of the output current Io1 may be different from that of the output current Io2 provided by the energy-storing unit 2044.

Please refer to FIG. 2A, and also refer to FIG. 1. The backup apparatus 20 further includes at least one first switch unit 206-1~206-n and a second switch unit 208. One terminal of each of the at least one first switch unit 206-1~206-n is jointly coupled to the power bus Pbus, and the other terminal of each of the at least one first switch unit 206-1~206-n is correspondingly coupled to the at least one backup modules 204-1~204-n. The second switch unit 208 is coupled between the power bus Pbus and the energy-storing unit 2044. The power supply apparatus 10 further includes at least one third switch unit 104-1~104-n. One terminal of each of the at least one third switch unit 104-1~104-n is jointly coupled to the power bus Pbus, and the other terminal of each of the at least one third switch unit 104-1~104-n is correspondingly coupled to the at least one conversion module 102-1~102-n.

When the input power Vin is normal and the required power of the load 200 is less than or equal to the first rated upper-limit value of the first output power Vout1, the second switch unit 208 is turned off and the at least one third switch unit 104-1~104-n is conducted. The power supply apparatus 10 converts the input power Vin into the first output power Vout1 and supplies the first output power Vout1 to the load 200 through the power bus Pbus.

In addition, if the power stored in the at least one backup modules 204-1~204-n is not full yet, the at least one first switch unit 206-1~206-n is conducted and the second switch unit 208 is turned off. The first output power Vout1 outputted from the power supply apparatus 10 is provided to the charging unit 2042 of each of the at least one backup module 204-1~204-n. If the power stored in the at least one backup modules 204-1~204-n is full, the at least one first switch unit 206-1~206-n is turned off. On this condition, the power supply apparatus 10 stops charging the at least one backup module 204-1~204-n.

When the input power Vin is normal and the required power of the load 200 is greater than the first rated upper-limit value of the first output power Vout1, the second switch unit 208 is conducted, the at least one third switch unit 104-1~104-n is conducted, and the at least one first switch unit 206-1~206-n is turned off. On this condition, the control unit 202 controls the energy-storing unit 2044 to provide the second output power Vout2 to the power bus Pbus through the second switch unit 208. Therefore, the second output power Vout2 provided from the energy-storing unit 2044 and the first output power Vout1 provided from the power supply apparatus 10 are jointly supplied to the load 200.

When the input power Vin is abnormal, the second switch unit 208 is conducted, the at least one third switch unit 104-1~104-n is turned off, and the at least one first switch unit 206-1~206-n is turned off. On this condition, the backup power Vb provided from the energy-storing unit 2044 is transmitted to the power bus Pbus through the second switch unit 208.

In addition, if one or more than one conversion module 102-1~102-n is damaged, the third switch unit(s) 104-1~104-n correspondingly coupled to the damaged conversion module(s) 102-1~102-n is/are turned off. On this condition, the damaged conversion module(s) 102-1~102-n can be disconnected from the power bus Pbus.

Figure 2B:
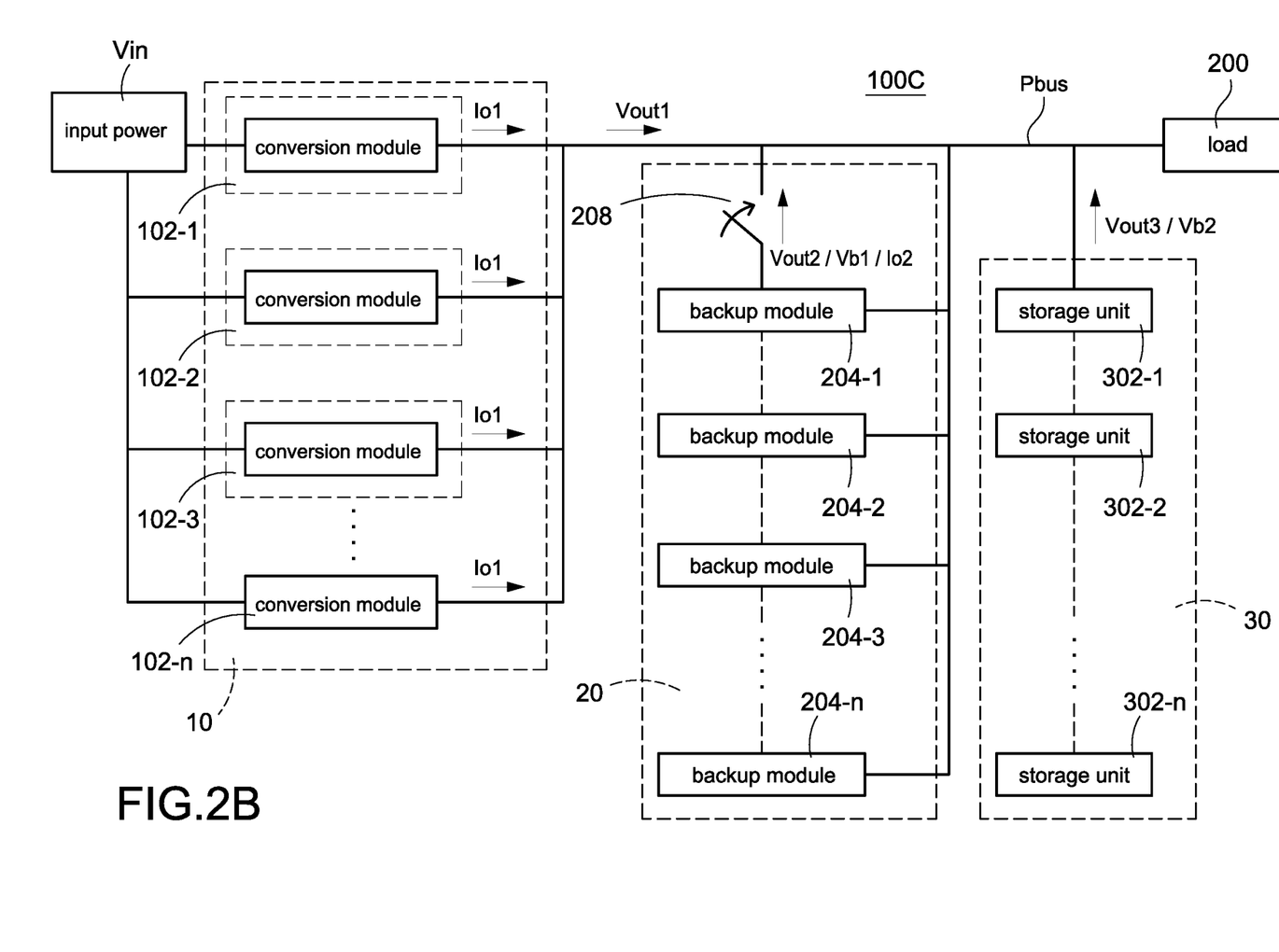
FIG. 2B is a schematic block diagram of the power supply system according to a second embodiment of the present disclosure.

Please refer to FIG. 2B, and also refer to FIG. 1 to FIG. 2A. The major difference between the power supply system 100B shown in FIG. 2B and the power supply system 100A shown in FIG. 2A is that the power supply system 100B further includes a storage apparatus 30. The storage apparatus 30 is coupled to the power supply apparatus 10, the backup apparatus 20, and the load 200 through the power bus Pbus. Specifically, the storage apparatus 30 includes at least one storage unit 302-1~302-n. If the number of the at least one storage unit 302-1~302-n is plural, the storage units 302-1~302-n are operated in parallel to provide backup power to the power bus Pbus.

The power density of the at least one storage unit 302-1~302-n shown in FIG. 2B is greater than that of the energy-storing unit 2044 shown in FIG. 2A, in which the energy-storing unit 2044 may be a super capacitor also referred as an electric double layer capacitor (EDLC). Therefore, when the load 200 requires additional power, the storage apparatus 30 can provide additional power faster than the energy-storing unit 2044 to supply the load 200. In addition, an energy density of the energy-storing unit 2044 is greater than that of the at least one storage unit 302-1~302-n, such as a battery, and therefore the energy-storing unit 2044 can provide additional power longer and more stable than the storage apparatus 30 to supply the load 200. In one embodiment, the at least one storage unit 302-1~302-n may be formed by a multiple in-series and/or in-parallel circuit structure, for example but not limited to that the at least one storage unit 302-1~302-n is formed by a matrix circuit structure.

When the input power Vin is normal, the power supply apparatus 10 can determine whether the backup apparatus 20 and/or the storage apparatus 30 are/is not fully charged according to a capacity status of the backup apparatus 20 and that of the storage apparatus 30. Therefore, the first output power Vout1 is provided through the power bus Pbus to charge the backup apparatus 20 and/or the storage apparatus 30 which are/is not fully charged.

In other embodiments, when the input power Vin is abnormal, the backup apparatus 20 provides a first backup power Vb1 to the power bus Pbus and the storage apparatus 30 provides a second backup power Vb2 to the power bus Pbus so that the backup apparatus 20 and the storage apparatus 30 jointly supply power to the load 200.

In other embodiments, when the input power Vin is abnormal, the storage apparatus 30 provides the second backup power Vb2 to supply the load 200 and then the backup apparatus 20 provides the first backup power Vb1 to supply the load 200.

In other embodiments, when the input power Vin is abnormal, the backup apparatus 20 provides the first backup power Vb1 to supply the load 200 and then the storage apparatus 30 provides the second backup power Vb2 to supply the load 200. Specifically, when the input power Vin is abnormal and the required power of the power bus Pbus is greater than a second rated upper-limit value of the first backup power Vb1, i.e., an instantaneous power of the load 200 is required, the storage apparatus 30 provides a third output power Vout3 to the power bus Pbus so that the sum of the first backup power Vb1 and the third output power Vout3 meets the required power.

When the input power Vin is normal and the required power of the load 200 is greater than the first rated upper-limit value of the first output power Vout1, the storage apparatus 30 provides the third output power Vout3 to the power bus Pbus so that the sum of the first output power Vout1 and the third output power Vout3 meets the required power of the load 200. Further, the backup apparatus 20 of the power supply system 100B does not include the control unit 202 in the power supply system 100A, and therefore a control strategy of the power supply system 100B is slightly different from that of the power supply system 100A.

Since the storage apparatus 30 of the power supply system 100B does not include any conversion unit and the power stored in the storage apparatus 30 is converted to supply the load 200, this kind of storage apparatus is referred as "passive storage apparatus". Since no additional conversion unit is needed in the power supply system 100B, it can save circuit costs and reduce circuit volume. In addition, since the absence of the control unit 202 in the backup apparatus 20 of the power supply system 100B for adjusting the output of the backup apparatus 20, it can also simplify and easy to control circuits of the power supply system 100B as well as save circuit costs.

Figure 2C:
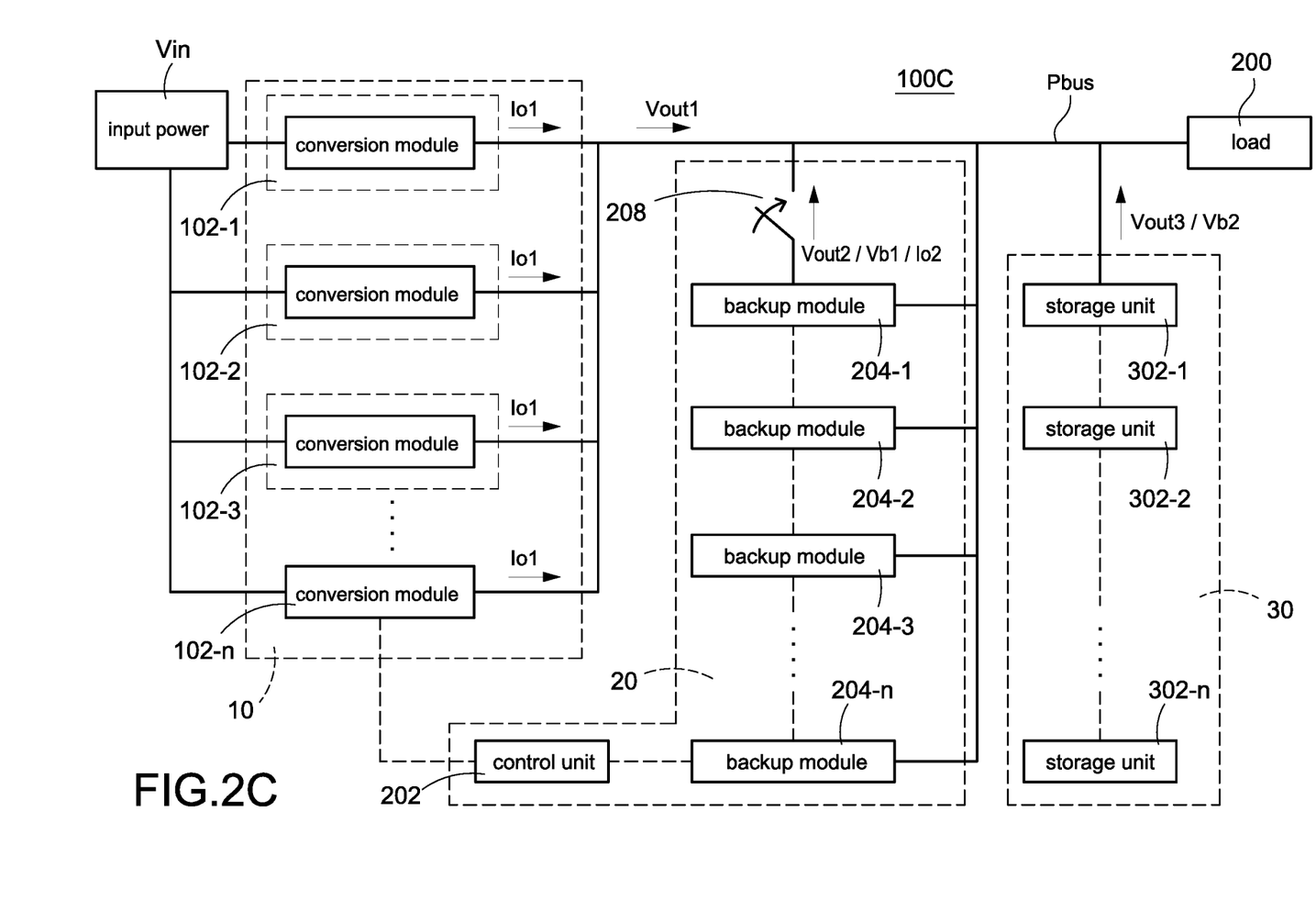
FIG. 2C is a schematic block diagram of the power supply system according to a third embodiment of the present disclosure.

Please refer to FIG. 2C, and also refer to FIG. 1 to FIG. 2B. The major difference between the power supply system 100C shown in FIG. 2C and the power supply system 100B shown in FIG. 2B is that the power supply system 100C further includes the control unit 202. The control unit 202 is coupled to the energy-storing unit 2044 and further incorporated with the current-sharing loop 110, which is like the power supply system 100A shown in FIG. 2A. The control unit 202 controls whether the energy-storing unit 2044 provides the second output power Vout2 to the power bus Pbus according to the required power of the load 200.

Specifically, although the power density of the storage unit 302-1~302-n is greater than that of the energy-storing unit 2044 and can provide additional power faster than the energy-storing unit 2044 to supply the load 200, the energy-storage capacity (energy density) of the storage unit 302-1~302-n is usually less than that of the energy-storing unit 2044. Hence, the storage unit 302-1~302-n may fail to stably provide the third output power Vout3 for a long time once the additional power of the load 200 is continuously required. That is, when the capacity of the storage unit 302-1~302-n is gradually reduced, the third output power Vout3 provided from the storage unit 302-1~302-n would be gradually less than the required additional power of the load 200. If the input power Vin is normal and the sum of the first rated upper-limit value of the first output power Vout1 and the third output power Vout3 fails to meet the required power of the load 200, the control unit 202 controls the energy-storing unit 2044 to provide the second output power Vout2 to the power bus Pbus. Therefore, the sum of the first output power Vout1, the third output power Vout3, and the second output power Vout2 is continuously supplied to the load 200 so as to extend the time of supplying power to the load 200 in the power supply system 100C.

In conclusion, the present disclosure has following features and advantages:

1. The backup apparatus and storage apparatus with different energy densities and power densities can be selectively used and the corresponding control manners can be implemented according to actual conditions of the input power and the load so that the load can be stably and continuously supplied the required general power and the additional instantaneous power.

2. The power supply system having the hybrid power supply apparatus, backup apparatus, and storage apparatus complementarily provides the required power of the load so that different powers including the first output power, the second output power, the third output power, and the backup power flexibly supply power.

3. The control unit can be incorporated with the current-sharing loop if the load needs the required instantaneous power so that the output current of each conversion module and the output current of each backup apparatus is equally shared, thereby avoiding damaging each conversion module and each backup apparatus from overloading thereof.

4. Since no additional conversion unit is needed in the storage apparatus of the power supply system, it can save circuit costs and reduce circuit volume by the characteristic of the impedance matching of the storage unit inside the storage apparatus.

5. Besides the first output power, the second output power and/or the third output power can be further provided according to the required power of the load so as to extend the time of supplying power to the load in the power supply system.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A power supply system, coupled to a load and the power supply system comprising:
    a power supply apparatus configured to receive an input power and supply power to the load through a power bus, the power supply apparatus comprising:
        at least one conversion module, each conversion module comprising:
            a current-sharing unit coupled to the power bus, and configured to equally share at least one output current outputted from the at least one conversion module, and
    a backup apparatus coupled to the power bus, the backup apparatus comprising:
        at least one backup module coupled to the power bus, and
        a control unit coupled to the at least one backup module and the current-sharing unit,
    wherein when the input power is normal, the power supply apparatus is configured to convert the input power into a first output power, provide the first output power to the power bus, and selectively provide the first output power to charge the backup apparatus; wherein the first output power has a first rated upper-limit value;
    wherein when the input power is normal and a required power of the load is greater than the first rated upper-limit value, the backup apparatus is configured to provide a second output power to the power bus so that the sum of the first output power and the second output power meets the required power of the load;
    wherein when the input power is normal and the required power is greater than the first rated upper-limit value, the control unit is configured to control the at least one backup module to provide the second output power to the load through the power bus, and the control unit is incorporated with the current-sharing unit to equally share the sum of the at least one output current outputted from the at least one conversion module and an output current provided from the at least one backup module.

2. The power supply system in claim 1, wherein each backup module further comprising:
    a charging unit coupled to the power bus, and
    an energy-storing unit coupled to the control unit, the charging unit and the power bus, and
    wherein when the input power is normal and the required power is greater than the first rated upper-limit value, the control unit is configured to control the energy-storing unit to provide the second output power to the load through the power bus.

3. The power supply system in claim 2, wherein the backup apparatus further comprises:
    at least one first switch unit correspondingly coupled to the at least one backup module,
    wherein when the at least one first switch unit is conducted, the first output power is provided to the charging unit through the at least one first switch unit, and the charging unit is configured to convert the first output power into a charging power to charge the energy-storing unit.

4. The power supply system in claim 2, wherein each conversion module further comprising:
    a conversion unit coupled to the current-sharing unit and configured to receive the input power,
    wherein the conversion unit is configured to convert the input power into the first output power.

5. The power supply system in claim 1, further comprising:
    a storage apparatus coupled to the power bus,
    wherein the storage apparatus comprises at least one storage unit and the backup apparatus comprises at least one energy-storing unit; a power density of the at least one storage unit is greater than a power density of the at least one energy-storing unit, and/or an energy density of the at least one storage unit is less than an energy density of the at least one energy-storing unit.

6. A power supply system coupled to a load, the power supply system comprises:
    a power supply apparatus configured to receive an input power and supply power to the load through a power bus, the power supply apparatus comprising:
        at least one conversion module, each conversion module comprising:
            a current-sharing unit coupled to the power bus, and configured to equally share at least one output current outputted from the at least one conversion module, and
    a backup apparatus coupled to the power bus, the backup apparatus comprising:
        at least one backup module coupled to the power bus, and
        a control unit coupled to the at least one backup module and the current-sharing unit,
    a storage apparatus coupled to the power bus,
    wherein when the input power is normal, the power supply apparatus is configured to convert the input power into a first output power, provide the first output power to the power bus, and selectively provide the first output power to charge the backup apparatus and the storage apparatus; wherein the first output power has a first rated upper-limit value;
    wherein when the input power is normal and a required power of the power bus is greater than the first rated upper-limit value, the storage apparatus is configured to provide a third output power to the power bus so that the sum of the first output power and the third output power meets the required power of the power bus;
    wherein when the input power is abnormal, the power supply apparatus stops operating, and the backup apparatus is configured to provide a first backup power to the load through the power bus; wherein the first backup power has a second rated upper-limit value;
    wherein when the input power is normal and the sum of the first rated upper-limit value and the third output power fails to meet the required power, the control unit is configured to control the at least one backup module to provide a second output power so that the sum of the first output power, the third output power, and the second output power meets the required power, and the control unit is incorporated with the current-sharing unit to equally share the sum of the at least one output current outputted from the at least one conversion module and an output current provided from the at least one backup module.

7. The power supply system in claim 6, wherein when the input power is abnormal and another required power of the power bus is greater than the second rated upper-limit value, the storage apparatus is configured to provide the third output power to the power bus so that the sum of the first backup power and the third output power meets the another required power.

8. The power supply system in claim 6, wherein when the input power is abnormal, the storage apparatus is configured to provide a second backup power to the power bus so that the backup apparatus and the storage apparatus are configured to jointly supply power to the load.

9. The power supply system in claim 6, wherein
each backup module further comprising:
a charging unit coupled to the power bus, and
an energy-storing unit coupled to the charging unit and the power bus, and
at least one first switch unit correspondingly coupled to the at least one backup module, wherein when the input power is normal and the at least one first switch unit is conducted, the first output power is provided to the charging unit through the at least one first switch unit, and the charging unit is configured to convert the first output power into a charging power to charge the energy-storing unit.

10. The power supply system in claim 6, wherein the storage apparatus comprises at least one storage unit and the backup apparatus comprises at least one energy-storing unit; a power density of the at least one storage unit is greater than a power density of the at least one energy-storing unit, and/or an energy density of the at least one storage unit is less than an energy density of the at least one energy-storing unit.

11. The power supply system in claim 6, wherein
each conversion module further comprising:
a conversion unit coupled to the current-sharing unit and configured to receive the input power,
wherein the conversion unit is configured to convert the input power into the first output power.

* * * * *